United States Patent Office 3,054,065
Patented Sept. 11, 1962

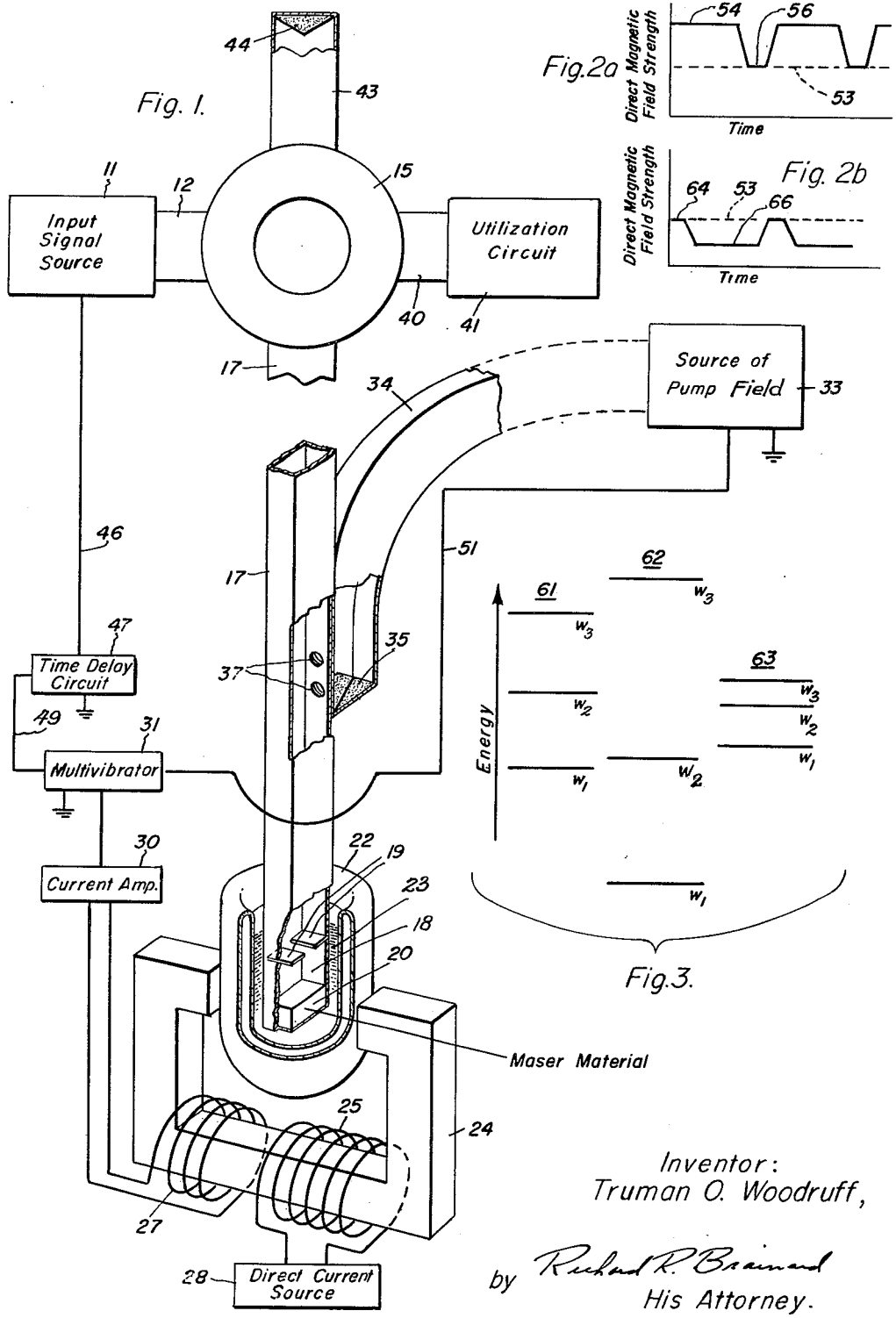

3,054,065
LOWER PUMP FREQUENCY MASER
Truman O. Woodruff, Rexford, N.Y., assignor to General Electric Company, a corporation of New York
Filed Feb. 26, 1959, Ser. No. 795,830
1 Claim. (Cl. 330—4)

The present invention relates to a maser amplifier in which the desired amplification is obtained through controlled variation of the direct magnetic field strength.

An amplifier has been recently developed in which the properties of paramagnetic materials are utilized. This amplifier is referred to as a "maser" which is an acronym derived from the principle of operation; microwave amplification by stimulated emission of radiation. The operation is based upon electron spins, which produce an effect comparable to that obtained with a dipole magnet mounted on a gyroscope.

In the atoms of most materials the electron spins are "paired" such that for every electron spinning in one direction, another electron spins in the opposite direction. The magnetic dipole moments of each "pair" cancel leaving no net magnetic effect. In certain solids, however, this pairing of electrons is incomplete and elements in the crystal, which are fixed in location, can be found with unpaired electrons localized in them. Since these elements are usually ions they will, in the following discussion, be referred to as paramagnetic ions. But it is to be realized that these elements are not necessarily ions. When a paramagnetic ion is placed in a direct magnetic field, it has an orientational energy of a magnitude depending on the angle between the magnetic dipole of the unpaired spins and the direction of the applied direct magnetic field. When the dipoles are aligned with the direct magnetic field, the ions have their lowest energy. They have their highest energy when the dipoles oppose the applied direct magnetic field. There are several other discrete positions that the dipoles in some materials can have with respect to the direction of the direct magnetic field, and a different energy level is associated with each position. The separation between these energy levels is a function of the magnitude of the applied direct magnetic field.

The quantum theory states that the radiation emitted by an electron in changing from a level of energy $W_3$ to a lower level of energy $W_1$, is of a frequency $$f=(W_3-W_1)/h$$

wherein $h$ is Planck's constant. The signal frequencies that a maser amplifies are approximately the same as the frequency associated with two energy levels of the paramagnetic material, and thus are a function of the magnitude of the applied direct magnetic field.

In the three-level maser, three energy levels are used in the amplification process. Thus, the maser material must have at least three energy levels although it may have more. The maser material is immersed in a radio frequency electromagnetic field having a frequency associated with the differences in energy levels between the highest and lowest of the three energy levels. This radio frequency field, called the pump field, causes the number, or population, of the paramagnetic ions in these two energy levels to become approximately equal. This is in contrast to the non-energized state in which the paramagnetic ions are most numerous in the low energy levels. For amplification, the population of these ions in one energy level must be greater than that in a lower energy level. Then the paramagnetic ions in making the transition from the higher to the lower energy level emit radio frequency energy which is used in the amplification process. This pump field, by equalizing the population of the highest and lowest of the three energy levels, causes either the population of the highest energy level to be greater than that of the intermediate energy level or the population of the intermediate energy level to be greater than that of the lowest energy level. The particular condition is a characteristic of the maser material utilized. For the first case, amplification can be had at a frequency associated with the separation between the highest and intermediate energy levels, and for the second case at a frequency associated with the separation between the intermediate and lowest energy levels. In the following paragraphs, operation only under the first case will be specifically discussed, but the considerations apply, generally, to both cases.

Since the pump field is associated with the highest and lowest energy levels, the frequency of the pump field is, in the prior three-level masers, higher than the frequency of the signal that is amplified. Also, since the upper limit of the pump field frequency is determined by the characteristics of electron tubes that generate and amplify this field, the upper frequency limit of the frequencies that the maser will amplify if, for many applications, too low.

Accordingly, an object of the present invention is to provide a three-level maser amplifier capable of amplifying a signal of higher frequency than the frequency of the pump field.

Another object is to provide a three-level maser amplifier for amplifying signals at very high frequencies.

In some applications it is desired to amplify signals at a frequency that is substantially independent of the pump field frequency. For example, only a pump field of a relatively fixed frequency may be available, and the separation of the energy levels of the paramagnetic ions required for pumping may not be appropriate for producing amplification at the desired frequency. Thus, in this application it is desirable that the maser system be capable of amplifying signals at many frequencies irrespective of the frequency of the pump field.

Hence, a further object of the present invention is to provide a maser amplifier for amplifying signals at frequencies that are substantially independent of the frequency of the pump field.

These and other objects are achieved in a preferred embodiment of my invention in which the maser material is immersed in a varying direct magnetic field having two magnitudes. One magnitude is selected such that it produces a separation of the highest and lowest of the three energy levels corresponding to the frequency of the pump field. The other magnitude is selected to produce a separation between energy levels corresponding to the desired amplification frequency. In the operation, the direct magnetic field is placed at the first magnitude and the population of the paramagnetic ions is equalized between the highest and lowest of the three energy levels. Then the magnitude of the direct magnetic field is changed to the second magnitude, the input signal is applied, and amplification obtained.

The novel features believed characteristic of the present invention are set forth in the appended claims. The invention itself, however, together with further objects and advantages thereof may best be understood by reference to the following description taken in connection with the accompanying drawing in which:

FIG. 1 is a schematic illustration of a preferred embodiment of the present invention, FIGS. 2A and 2B are graphs of ideal variations in direct magnetic field strength, and FIG. 3 comprises three sets of energy level diagrams.

In the preferred embodiment illustrated in FIG. 1 there is an input signal source 11 of the signals to be quency than for which amplification can be had with a prior type maser amplification with the given pump field frequency. Thus, the higher magnitude 54 exists for a much longer time than the lower magnitude 56.

In FIG. 3 there is illustrated three sets of energy levels 61, 62 and 63 corresponding, respectively, to an intermediate, a high, and a low direct magnetic field strength. It is seen that the separations between the energy levels depend directly on the strength of the direct magnetic field. That is the greater the strength of the magnetic field, the greater the separations between energy levels. Depending upon the maser material, there may or may not be energy levels not utilized in the maser operations but which may be between the illustrated energy levels.

In a particular application it may be possible to obtain a pump signal with a frequency corresponding to energy levels $W_3$ and $W_1$ of set 61 but not to the wider separated energy levels $W_3$ and $W_1$ of set 62. And yet it may be desired to amplify a signal having a frequency corresponding to the separation between energy levels $W_3$ and $W_2$ of set 62 which separation is much greater than the separation between the energy levels $W_3$ and $W_2$ in set 61. In prior maser amplifiers it would not be possible to pump between energy levels $W_3$ and $W_1$ of set 61 and amplify between energy levels $W_3$ and $W_2$ of set 62. But with the present invention this desired result is obtained.

To obtain this result, the direct current source 28 is adjusted such that the direct current flow through winding 25 causes the magnitude of the magnetic field corresponding to level 56 in FIG. 2A to produce the energy level separation of set 61. Also, the multivibrator 31 and/or amplifier 30 are adjusted such that the pulsing direct current flow through winding 27 causes the magnitude of the magnetic field corresponding to level 54 in FIG. 2A to produce the energy level separation of set 62.

For purposes of explanation of the operation of the embodiment of FIG. 1, it will be assumed that, initially, monostable multivibrator 31 is in its stable state. Then current amplifier 30 produces a current flow through winding 27 and the resultant magnetic field corresponds to level 54 in FIG. 2A. Thus, the paramagnetic ions in maser material 20 have energy level separations indicated by set 62 in FIG. 3 and the maser amplifier is in condition for amplifying an input signal the frequency of which corresponds to the separation between energy levels $W_3$ and $W_2$ of set 62. When an input signal to be amplified is produced or received by source 11, this signal is conducted by wave guide 12, circulator 15, and wave guide 17 to the cavity resonator 18 to be amplified by maser material 20. After amplification, the amplified signal is guided by wave guide 17, circulator 15 and wave guide 40 to a utilization circuit 41 where the amplified signal may, for example, produce a "pip" on an oscilloscope.

Simultaneously with the occurrence of the input signal, a pulse is applied through lead 46 to the time delay circuit 47. This circuit 47 delays this pulse until after the amplification process is completed and then the delayed pulse is conducted by lead 49 to trigger monostable multivibrator 31 into its non-stable state. When multivibrator 31 causes cessation of current flow in winding 27, the resulting magnetic field strength, which drops to the level 56 indicated in FIG. 2A, produces the energy level separation of set 61. Now the energy level separation between the highest and lowest of the three utilized energy levels of the maser material 20 corresponds to the frequency of the pump field.

When monostable multivibrator 31 reverts to its non-stable state, it also produces a signal on lead 51 that triggers source 33 into production of the pump field. This pump field equalizes the population of the paramagnetic ions in energy levels $W_3$ and $W_1$ thereby placing the maser material 20 in condition for amplification again.

The frequency determining resistances and capacitances of multivibrator 31 have been previously adjusted such that the length or duration of the non-stable state of monostable multivibrator 31 is just sufficiently long to permit this equalization of the population of the paramagnetic ions. Then the multivibrator 31 reverts to its stable state and in reverting causes the source 33 to stop producing the pump field, and causes the current amplifier 30 to produce a current flow in winding 27 such that the resultant magnetic field corresponds to level 54 in FIG. 2A. Thus, the maser amplifier is in condition for amplification again.

For a radar application it will, in most applications, probably be preferred that multivibrator 31 be of the bi-stable type. Also, the time delay circuit 47 can be eliminated, or replaced by a differentiating circuit. The leading edge of the transmitted radar pulse can be used to produce a pulse, as for example by differentiation, to switch multivibrator 31 into the state in which it triggers pump signal source 33 and causes cessation of current flow through winding 27 so that the maser material 20 is in a condition to be energized by the pump field. The trailing edge of the radar pulse can be used to produce a pulse to trigger multivibrator 31 back into its other state which causes source 33 to cut off and the initiation of current flow through winding 27. Thus, during the occurrence of the transmitted radar pulse the maser material 20 is energized while at all other times it is in condition to amplify the received radar pulses. In many radar applications the pulses are of the order of 1 millisecond, which time is sufficient for the energization of the maser material 20.

In the above explained operation, the frequency of the signal that was amplified was much greater than that corresponding to the separation between adjacent energy levels of set 61 of FIG. 3. There may also be applications in which the frequency to be amplified is less than that corresponding to the separation between adjacent energy levels of set 61. In this latter case the current flow from amplifier 30 through winding 27 may produce a magnetic field opposing the magnetic field produced by winding 25 such that the resultant magnetic field is less than that produced by current flow through winding 25. In FIG. 2B there is illustrated a variation in field strength for this condition of operation. There are two levels 64 and 66 of magnetic field strength corresponding, respectively, to the pumping and amplification periods. The magnetic field strength of level 64 produces the energy level separation of set 61 which has the separation between energy levels $W_1$ and $W_3$ necessary for the application of a pump signal. The magnetic field strength corresponding to level 66 produces the energy level separation of set 63 which has the desired separation between energy levels $W_3$ and $W_2$ for the amplification of the input signal.

Assume for purposes of explanation that the monostable multivibrator 31 is initially in its stable state. Then the current flow through winding 27 produces a magnetic field opposing that produced by the current flow through winding 25. The resultant magnetic field strength, which corresponds to level 66 in FIG. 2B, produces the energy levels separation of set 63 of FIG. 3. Thus, the maser amplifier is in condition for amplification. When the input signal, having a frequency corresponding to the separation between levels $W_3$ and $W_2$ of set 63 is produced or received by source 11, it is guided to cavity resonator 18, is amplified, and is guided to the utilization circuit 41.

Simultaneously with the reception or generation of this input signal, a signal is conducted to time delay circuit 47, is delayed until after the amplification period and is then conducted to multivibrator 31 which it triggers. Multivibrator 31 then reverts to its non-stable state and thus causes cessation of current flow in winding 27. Then the magnetic field increases to a magnitude corresponding to level 64 in FIG. 2B. This field strength produces the energy level separation of set 61. Consequently, the maser material 20 is in condition to be pumped by the pump field.

When the multivibrator 31 reverts to its non-stable state it also causes source 33 to produce a pump field for equalizing the paramagnetic ion population of levels $W_3$ and $W_1$ of set 61 of FIG. 3.

The non-stable condition of multivibrator 31 is of a duration to permit this equalization of the paramagnetic ion population. Then multivibrator 31 reverts to its stable state and in so doing stops the generation of the pump field and causes current flow through winding 27. Thus, the maser amplifier is then again in condition for amplification.

It should be noted that the first explained operation of the embodiment of FIG. 1 was directed to an application in which the frequency of the signal to be amplified was greater than that corresponding to the separation of two adjacent energy levels for that arrangement of the three energy levels required for the pumping operation. Actually, of course, only two energy levels are required for pumping but once these two energy levels are fixed, the intermediate level is determined. The frequency of the signal to be amplified can not only be higher as explained above, but it also can be higher than the frequency of the pump signal. In the second explained operation, the frequency of the signal to be amplified was less than that corresponding to the separation of two adjacent energy levels for that arrangement of the three energy levels required for the pumping operation. From these two explained operations it is apparent that the frequency of amplification is substantially independent of the frequency of the pump field. It is, of course, not totally independent due to the limitations of the obtainable field strength and also to the limitations of the energy level separations that can be obtained.

There is a limitation also to the repetition rate. The time interval between the end of pumping and the receipt of the signal to be amplified must not be longer than the time required for the difference in the ion populations of the levels to return without stimulation to the equilibrium values.

It was previously mentioned that an alternating current could be applied to winding 27 instead of a varying direct current. When an alternating current is used, either the pumping operation or the amplifying operation occurs at the positive peak—the particular operation depending on whether a high or low frequency signal is to be amplified—and the other operation occurs at the negative peak. Preferably, the peak magnetic field strength variation is less than the strength of the magnetic field produced by the current flow through winding 25.

It is to be realized that the winding 27 may be part of a tuned circuit, the other part of which is a capacitor. Then when the magnetic field decreases in magnitude, the energy of this field is not dissipated but is stored in the form of an electron charge on the capacitor. This energy can be recovered by discharging the capacitor through winding 27. The current from amplifier 30 then need be sufficient only to provide for the low ohmic losses.

Although the invention has been described with reference to an amplifier, it is to be realized that it also has utility in modified amplifier circuits, such as, for example: oscillator circuits. In oscillator applications the maser material may be placed in a high "Q" cavity resonator in which the maser operation maintains the radio frequency oscillations in the cavity resonator by periodic amplification. Of course, no input signals are applied other than the pump field pulses.

Although the invention has been described with respect to certain specific embodiments, it will be appreciated that many modifications and changes may be made by those skilled in the art without departing from the spirit of the invention. I intend, therefore, by the appended claims to cover all such modifications and changes as fall within the true spirit and scope of the invention.

What I claim as new and desire to secure by Letters Patent of the United States is:

A maser system for amplifying input pulse signals comprising magnetic field-producing means including a core and a first coil operatively associated with the core and connected to a source of direct current electric power for providing a first level of magnetic field strength, magnetic field-modifying means including a second coil operatively associated with the core, cavity resonator means providing a cavity resonator, a crystal of maser material disposed in the cavity resonator and having in the presence of a magnetic field at least three electron energy levels, input signal source means, utilization circuit means, wave guide means connecting the input signal source means to the cavity resonator means and to the utilization circuit means for conducting microwave input signals to the cavity resonator and the crystal and for conducting amplified microwave signals from the cavity resonator to the utilization circuit means, pump field source means operatively connected to the cavity resonator means for pumping the maser crystal at a frequency resulting in an inversion between two non-adjacent energy levels, and switch means for controlling energization of said second coil in response to actuations of the input signal source means and for synchronizing actuation of the pump field source means with the delivery of microwave input signals into the wave guide means by the input signal source means, said second coil on each actuation increasing the magnetic field strength to a higher level to provide a separation of two adjacent inverted energy levels of the maser crystal corresponding to the frequency of the input signal which is then greater than the frequency of said non-adjacent energy levels at said first level of magnetic field strength.

References Cited in the file of this patent

UNITED STATES PATENTS 3,023,367     Chester et al. _____ Feb. 27, 1962

OTHER REFERENCES

Bloembergen: "Physical Review," Oct. 15, 1956, pages 324–327.

Feher et al.: "Physical Review," Jan. 15, 1957, pages 760–763.

McWhorter et al.: "Physical Review," Jan. 15, 1958, pages 312–318.

Whittke: "Proceedings of the IRE," March 1957, pages 291–316.